April 24, 1962   J. F. FRENCH ET AL   3,031,065
APPARATUS FOR PROCESSING PRODUCTS IN SEALED CONTAINERS
Filed Oct. 27, 1958   10 Sheets-Sheet 1

FIG_1

INVENTORS
JOHN F. FRENCH
JOHN BOYCE

BY *Hans G. Hoffmeister*
ATTORNEY

United States Patent Office 3,031,065
Patented Apr. 24, 1962

3,031,065
APPARATUS FOR PROCESSING PRODUCTS IN SEALED CONTAINERS
John F. French and John Boyce, San Jose, Calif., assignors to FMC Corporation, a corporation of Delaware
Filed Oct. 27, 1958, Ser. No. 769,709
13 Claims. (Cl. 198—106)

The present invention pertains to apparatus for processing products in sealed containers, and more particularly relates to apparatus for carrying out the continuous cooking and cooling of comestibles in sealed containers.

In processing apparatus of the type having hydrostatic water legs which act as pressure valves through which containers are conveyed into a pressurized steam cooking chamber, it is common practice to provide flat walls for both the cooking chamber and for the water legs so that the walls can act as guides to prevent articles from being dislodged from the conveyor which carries the articles through the apparatus. Since the water legs are frequently 40 to 50 feet tall and the width of each cooking chamber is approximately six feet, it can be seen that the pressures developed within each chamber will bow the flat side walls outwardly unless the walls are reinforced by stiffeners or are sufficiently thick to withstand such pressures. The provision of reinforcing and stiffening structures makes such processing apparatus very expensive.

It is, therefore, one object of the present invention to provide an improved hydrostatic pressure cooker that is relatively inexpensive to manufacture but is capable of withstanding all pressures developed within such cookers.

Another object is to provide a continuous cooker having improved article handling mechanism.

Another object is to provide an improved article conveyor for a continuous cooker.

Another object is to provide a continuous cooker having an improved article feed mechanism.

Another object is to provide a continuous processing apparatus having an improved article feed mechanism arranged to feed articles into a conveyor along a straight run thereof.

Another object is to provide a continuous cooker having an improved article discharge mechanism arranged to discharge articles from a straight run of the article carrying conveyor.

Another object is to provide a continuous cooker having improved apparatus for cooling articles after they have been cooked.

These and other objects and advantages of the present invention will become apparent from the following description and the accompanying drawings, in which.

Figure 1:
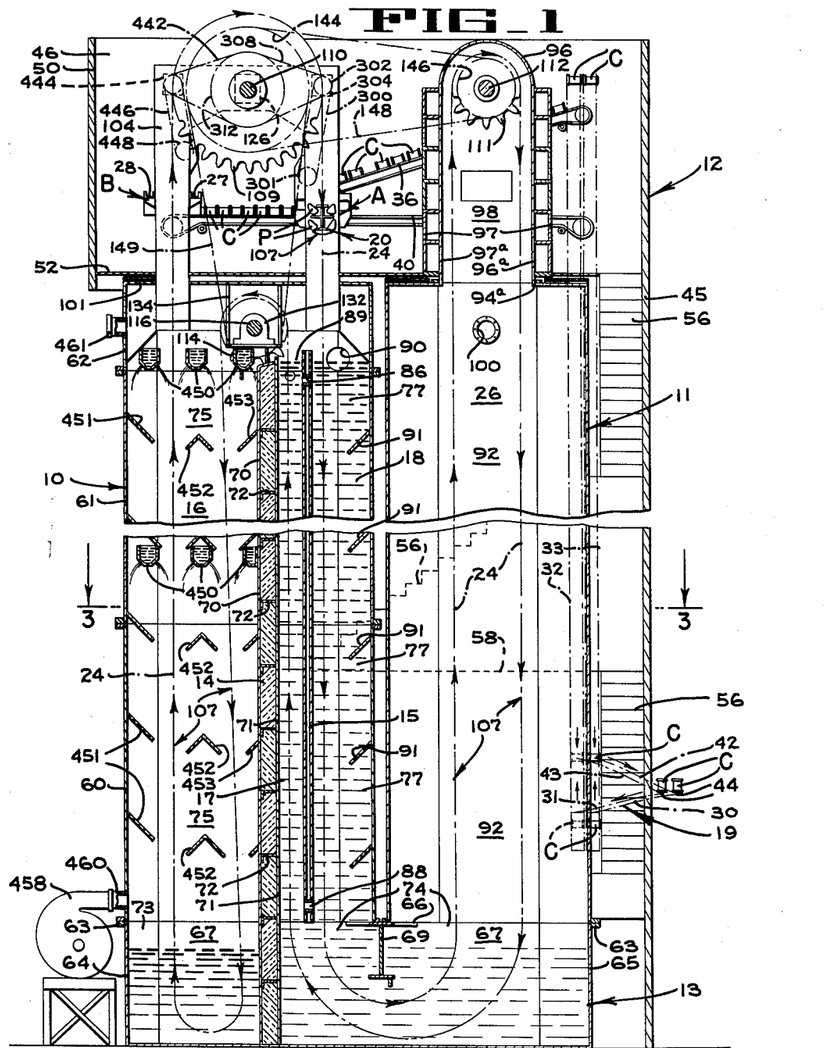
FIG. 1 is a diagrammatic vertical central section of the continuous cooker and cooler of the present invention, certain parts being broken away.
Figure 5:
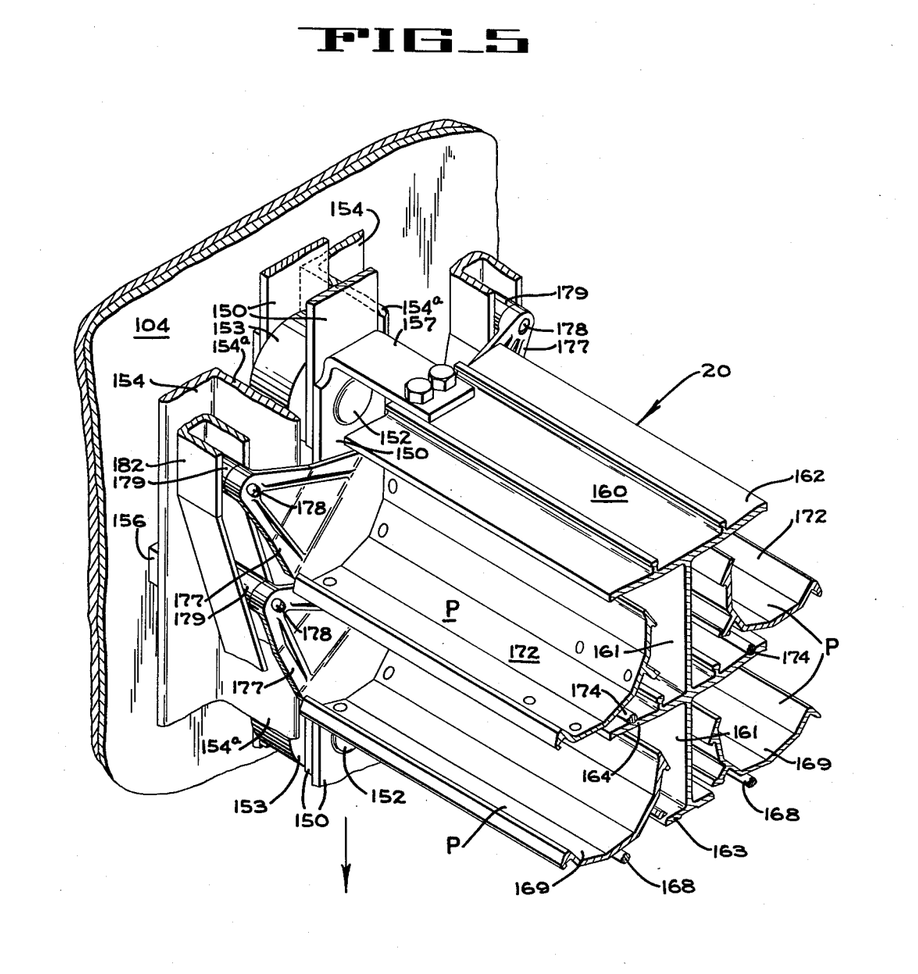
FIG. 5 is an enlarged perspective of an end portion of one of the carriers used in the machine of FIG. 1.

The continuous cooker and cooler of the present invention comprises two large vertically disposed cylindrical tanks 10 and 11 (FIGS. 1 and 3) mounted within an enclosure 12. The tanks 10 and 11 are approximately 50 feet in height and have open bottoms communicating with a trough 13 (FIG. 1). The tank 10 has two partitions 14 and 15 which divide the tank into a cooling chamber 16 and two water legs 17 and 18. Cans C of produce to be treated are introduced into the enclosure 12 at the right side thereof (FIG. 1) by means of a feed conveying system 19 which elevates the cans to the top of the enclosure and then moves them across the top of the enclosure (FIG. 2) to the center of the machine where the cans are formed into two lines L1 and L2, with the cans of each line disposed in end-to-end relation. The lines extend to a feed station A above the tank 10 and on opposite sides of side-by-side pockets P (FIG. 5) of a carrier 20. At station A (FIG. 2), approximately fourteen cans of each line are shifted as a unit into the pockets P by pusher members 21 and 22 of a feed mechanism 23. Each carrier 20 is secured between two continuously moving endless chains 24 and 25 which transport the carrier downwardly through the water leg 18 (FIG. 1) in which the cans are gradually heated, then consecutively up and down through a hot steam chamber 26 provided by tank 11, then up through water leg 17 in which the temperature of the cans is gradually reduced, and finally consecutively down and up through cooling chamber 16 where the cans are subjected to sprays of cooling water and currents of cooling air. The cooled cans are carried upwardly out of cooling chamber 16 and are diverted at a discharge station B onto two discharge conveyors 27 and 28 which remove them from the discharge station.

The feed conveying system 19 (FIG. 1) comprises two chutes 30 and 31 which deliver cans into two continuously moving elevators 32 and 33, respectively. At the top of the enclosure 12 (FIG. 2), the cans are discharged from the descending runs of the elevators into chutes 34 and 35 which direct the cans onto endless belt conveyors 36 and 37, respectively. The conveyor 36 discharges consecutive cans onto an endless belt conveyor 38 which forms line L1 and carries the line through the feed station A. Similarly, conveyor 37 discharges consecutive cans onto an endless belt conveyor 39 which forms line L2 and carries the line through the feed station A.

Figure 2:
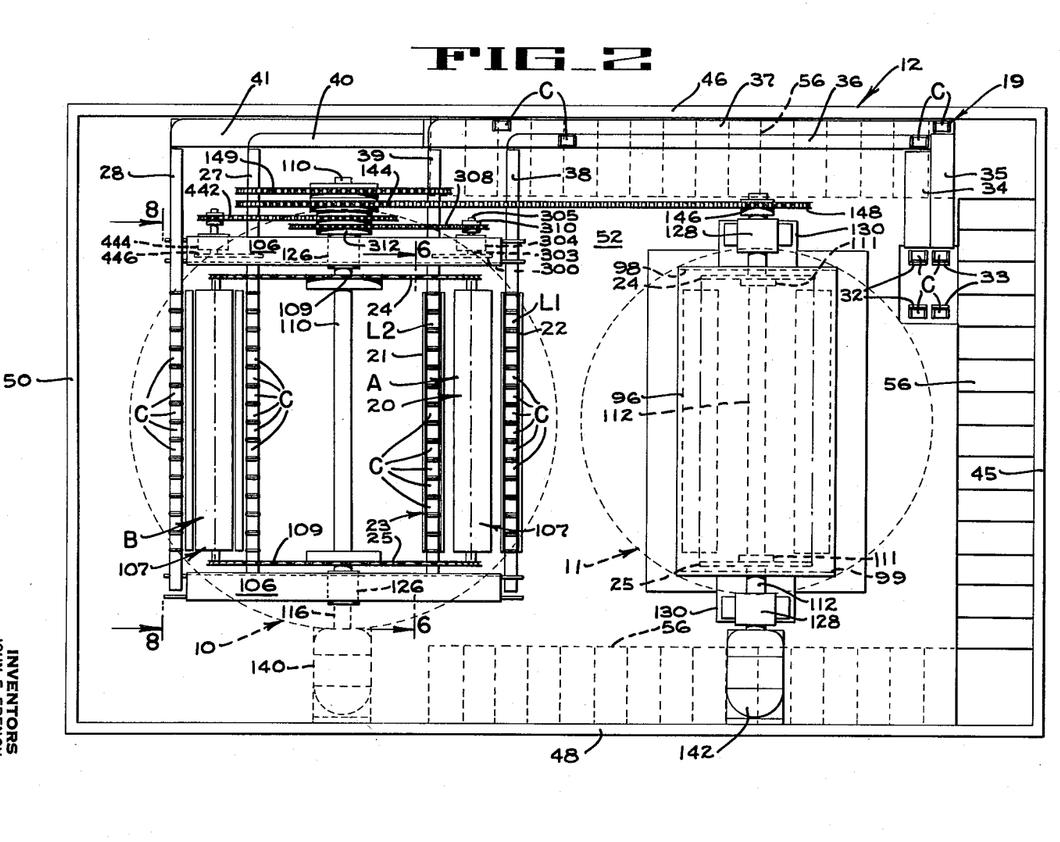
FIG. 2 is an enlarged diagrammatic plan of the cooker of FIG. 1.
Figure 3:
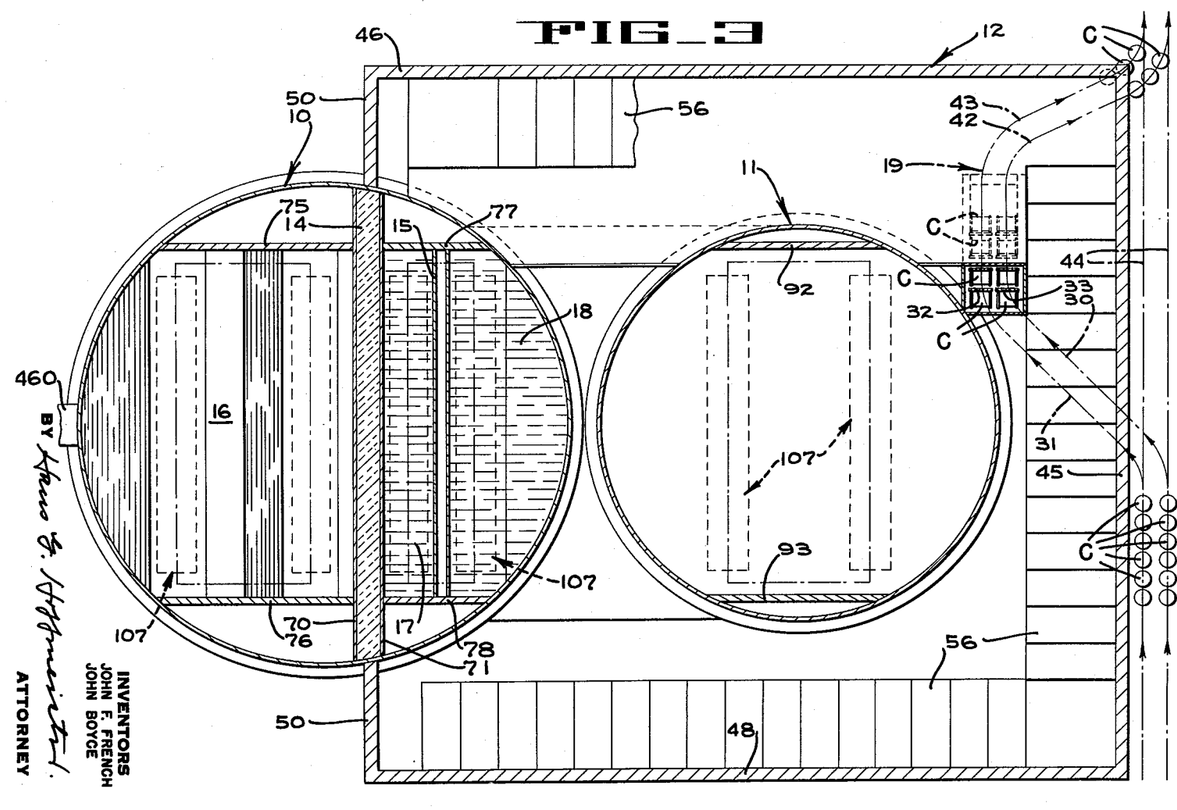
FIG. 3 is an enlarged section taken along lines 3—3 of FIG. 1.

The discharge conveyors 27 and 28 (FIG. 1) receive lines of processed cans at station B and carry them away from station B at a speed such that the lines are clear of the discharge mechanism before following lines of processed cans are discharged from the mechanism. The conveyors 27 and 28 are endless belt conveyors and they deliver cans one by one to two other endless belt conveyors 40 and 41 (FIG. 2). These conveyors 40 and 41 extend below the incoming conveyors 36 and 37 and below chutes 34 and 35 and are arranged to discharge into downwardly moving runs of the elevators 32 and 33. At the lower end of the elevators the cans are directed into chutes 42 and 43 which guide the cans onto discharge conveyors 44.

The enclosure 12 comprises a front wall 45 (FIG. 2), two side walls 46 and 48, and a rear wall 50. A platform 52 (FIGS. 1 and 2) is disposed above the tanks 10 and 11 and is suitably supported by the walls 45, 46, 48 and 50, which walls project upward beyond the platform to provide sides therefor. A roof (not shown) can be mounted on the upper end of the walls 45, 46, 48 and 50 if desired. Suitable stairways 56 (FIG. 1) and horizontal catwalks 58 lead from the lower floor, which supports the cooker, to the platform 52.

The tank 10 is made up of three superposed cylindrical sections 60, 61 and 62 (FIG. 1) which have peripheral flanges that are bolted together. The lowermost section 60 is bolted to a peripheral flange 63 disposed on the upper edge of the trough 13. The trough has a large partially cylindrical wall portion 64 (FIG. 4), concentric with and directly below the tank 10, and a smaller, partially cylindrical wall portion 65 concentric with and disposed below the tank 11. Two elongated vertical partitions or walls 67 and 68 are welded to the walls and to the bottom of the trough 13 to define an elongated reservoir. A transverse beam 69 (FIG. 1) is secured between the walls 67 and 68 to provide rigidity to the trough 13 and to support a plate 66 (FIG. 4) that forms a top closure plate for the portions of the trough 13 that are not covered by the tanks.

Figure 4:
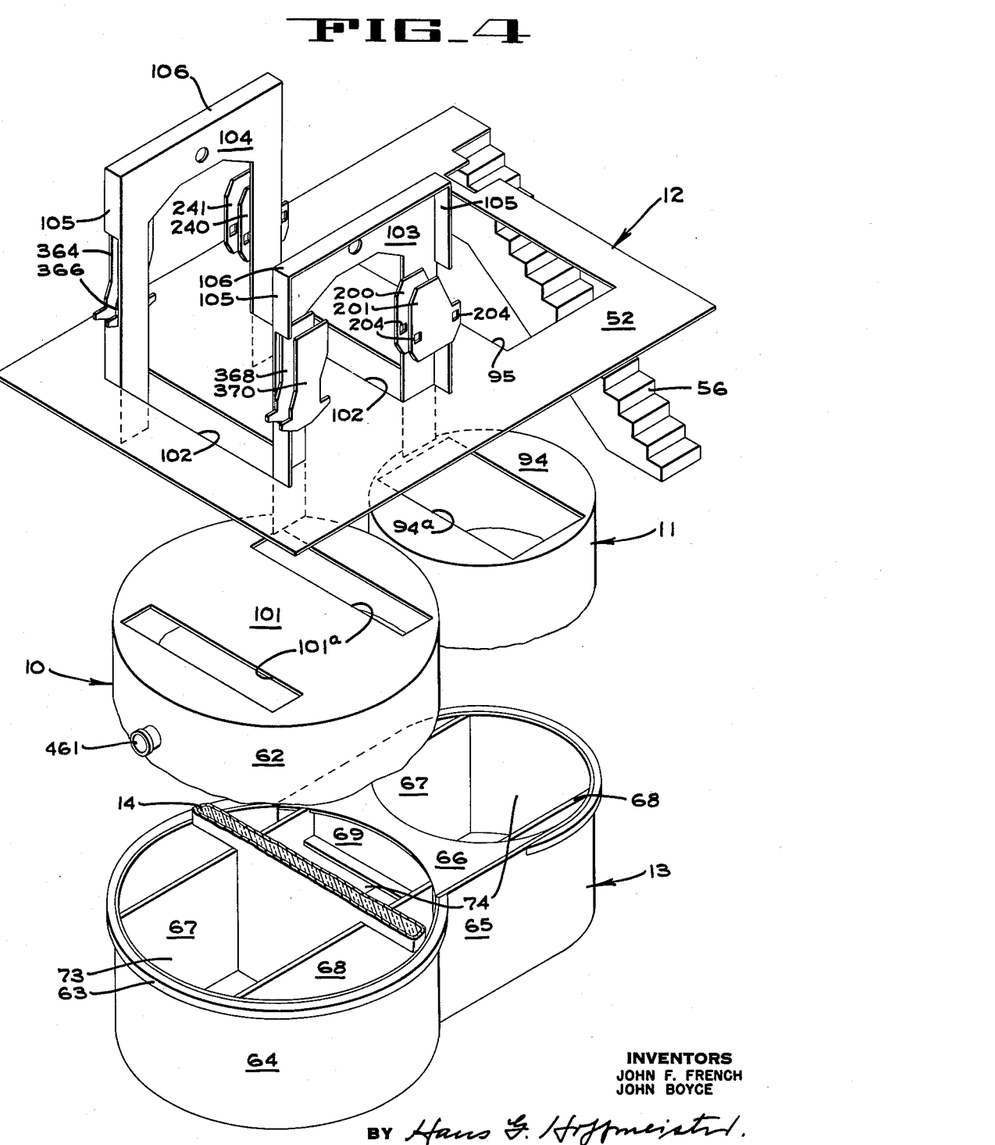
FIG. 4 is a fragmentary exploded perspective of certain supporting structure of the apparatus of FIG. 1.

The partition 14 (FIGS. 1 and 3), which extends vertically in the tank 10, is provided with insulating material disposed between two parallel side walls 70 and 71 that are separated by pressure resisting stiffening spacers 72. The partition 14 is welded to the cylindrical wall of tank 10 and projects down into trough 13 and is welded in fluid tight relation to the side walls 67 and 68 to divide the trough into two reservoirs 73 and 74 (FIG. 4). Spaced parallel walls 75 and 76 (FIG. 3) extend vertically through tank 10 directly above the walls 67 and 68, respectively, and are welded to the partition 14 and to the cylindrical wall of the tank to define the cooling chamber 16 therebetween. The walls 75 and 76 extend the entire vertical length of the cooling chamber 16 and cooperate with walls 67 and 68 of the trough 13 to provide means for mounting certain conveyor guiding structure which will be described presently. If desired, the walls 75 and 76 may be replaced by vertically spaced angle bars. With this arrangement, the cooling chamber 16 will extend to the wall of the tank 10.

Side walls 77 and 78, which are disposed in the same vertical planes as the walls 75 and 76, respectively, are welded to the partition 14 and to the cylindrical wall of tank 10 to define a hydrostatic sealing chamber which is in communication with the reservoir 74 of the trough 13. As previously mentioned, the hydrostatic sealing chamber within the cylindrical tank 10 is separated into an inlet water leg 18 and a discharge leg 17 by the partition 15 which is welded to the side walls 77 and 78. Fluid flow ports 86 and 88 (FIG. 1) extend through the partition 15 adjacent the upper end and lower end thereof, respectively.

Cold water is directed into the upper end of the discharge leg 17 through a pipe 89 (FIG. 1) and, during the operation of the continuous cooker and cooler, this water circulates downwardly in the leg 17, through the port 88 and upwardly in the leg 18, then through the port 86 and back to the leg 17. Excess water is discharged from the upper end of the leg 18 by flowing into an overflow pipe 90. This water is thereafter discharged from the continuous cooker and cooler by any suitable piping system (not shown). Baffles 91, welded to the curved wall of the leg 18, prevent an excessively rapid rise of hot water in this leg.

The cylindrical tank 11 is also bolted at its lower end to the flange 63 of the trough 13. Two side walls 92 and 93 (FIG. 3) extend vertically through the steam chamber 26 in planar alignment with the walls 67 and 68, respectively, of the trough 13 and are rigidly secured to the cylindrical wall of the tank 11 in such a way that steam is present on both sides of the walls 92 and 93 and accordingly the pressure on both sides will be the same. Since the main function of the walls 92 and 93 is to support the conveyor guide tracks, these walls may be formed of vertically spaced angle bars.

The upper end of tank 11 is closed by a plate 94 (FIG. 4) which has an elongated rectangular opening 94a in vertical alignment with a similarly shaped, but somewhat larger opening 95 in the platform 52. A cover 96 (FIG. 1) of inverted U-shape has a rectangular lower end portion 96a which extends into the opening 94a and is welded therein to provide a fluid tight seal between the steam chamber 26 and the interior of the cover 96. The cover is provided with a compartmented, strengthening housing 97 which has a lower end portion 97a disposed in the opening 95 of the platform 52. Side closure plates 98 and 99 (FIG. 2) of the elongated cover 96 are in planar alignment with the internal walls 92 and 93, respectively, of the tank 11. The chamber 26 is filled with steam under pressure which enters the chamber through a pipe 100 (FIG. 1) and, therefore, the chamber 26 will hereinafter be referred to as the sterilizing chamber. Steam piping (not shown) may also be provided in the water legs 17 and 18 of the hydrostatic chamber to initially heat the water therein to operating temperature.

The upper end of tank 10 is closed by a circular plate 101 (FIG. 4) which is welded to the tank and has two elongated rectangular openings 101a which are in registry with two similarly-shaped openings 102 in the platform 52. A pair of spaced, parallel vertically extending mounting plates 103 and 104 are mounted on the platform 52. Each plate is of generally inverted U-shape with the lower end portions of each leg projecting downwardly through one of the openings 102 in the platform 52 and through an aligned opening 101a in the top wall 101 of the tank 10. Each of the mounting plates 103 and 104 is stiffened by two vertical side flanges 105 and a top flange 106, and the plates 103 and 104 and the side flanges 105 are welded or otherwise secured in fixed position on the platform 52.

The endless chains 24 and 25 (FIG. 2) which move the trough-like carriers 20 through the machine, are mounted for movement in spaced parallel vertical planes on opposite sides of the machine. The chains 24 and 25 and carriers 20 define a conveyor 107. As seen in FIGS. 1 and 2, each chain is trained around one of two spaced sprockets 109 keyed on a shaft 110 above tank 10, then around one of two spaced sprockets 111 keyed on a shaft 112 above tank 11, and around one of two spaced sprockets 114 keyed on a shaft 116 that extends across the upper end of tank 10. The shaft 110 is journalled in two bearings 126 (FIG. 2) each of which is secured to the rear face of one of the mounting plates 103 or 104. The shaft 112 is journalled in bearings 128 which are mounted on brackets 130 secured to the side closure plates 98 and 99 of the tank cover 96. The shaft 116 (FIG. 1) is journalled in bearings 132 mounted on U-shaped brackets 134 secured to and projecting downwardly from the circular cover plate 101 of tank 10.

Two synchronized gear reduction motors 140 and 142 (FIG. 2) are provided to drive the conveyor 107 and are coupled to the shafts 116 and 112, respectively. A sprocket 144 (FIG. 2) keyed to the shaft 110 and a sprocket 146 keyed to the shaft 112 have a drive chain 148 trained therearound. A similar chain drive 149 (shown diagrammatically in FIG. 1) can be connected between the shafts 110 and 116 to prevent any possibility of unsteady driving by the two motors 140 and 142, which continuously drive the conveyor chains 24 and 25 through the cooker 20 in the direction of the arrows in FIG. 1.

Each of the conveyor chains 24 and 25 is made up of a plurality of links 150 (FIG. 6) connected together by pins 152. A roller 153 is journalled on each pin 152 and is confined between a pair of parallel, spaced angle guide tracks 154 (FIG. 5) having inwardly directed legs 154a which define continuous tracks for guiding the conveyor chains in their path of movement. On one side of the machine, the guide tracks 154 lie in a common vertical plane and are rigidly secured to the planar aligned surfaces provided by the inner faces of the mounting plate 104 (FIG. 5), the walls 75, 77 and 92 (FIG. 3) of the tanks 10 and 11, the wall 67 (FIG. 4) of the trough 13, and the side closure plate 98 of the tank cover 96. Spacers 156 (FIG. 5) are disposed between the angle members 154 and their supporting surfaces to compensate for slight misalignment in these surfaces. On the other side of the machine, the guide tracks 154 lie in a common vertical plane and are secured to the corresponding planar aligned surfaces provided by the mounting plate 103, the walls 76, 78 and 93 of the tanks, the walls 68 of the trough and the side closure plate 99 of the tank cover 96.

Figure 6:
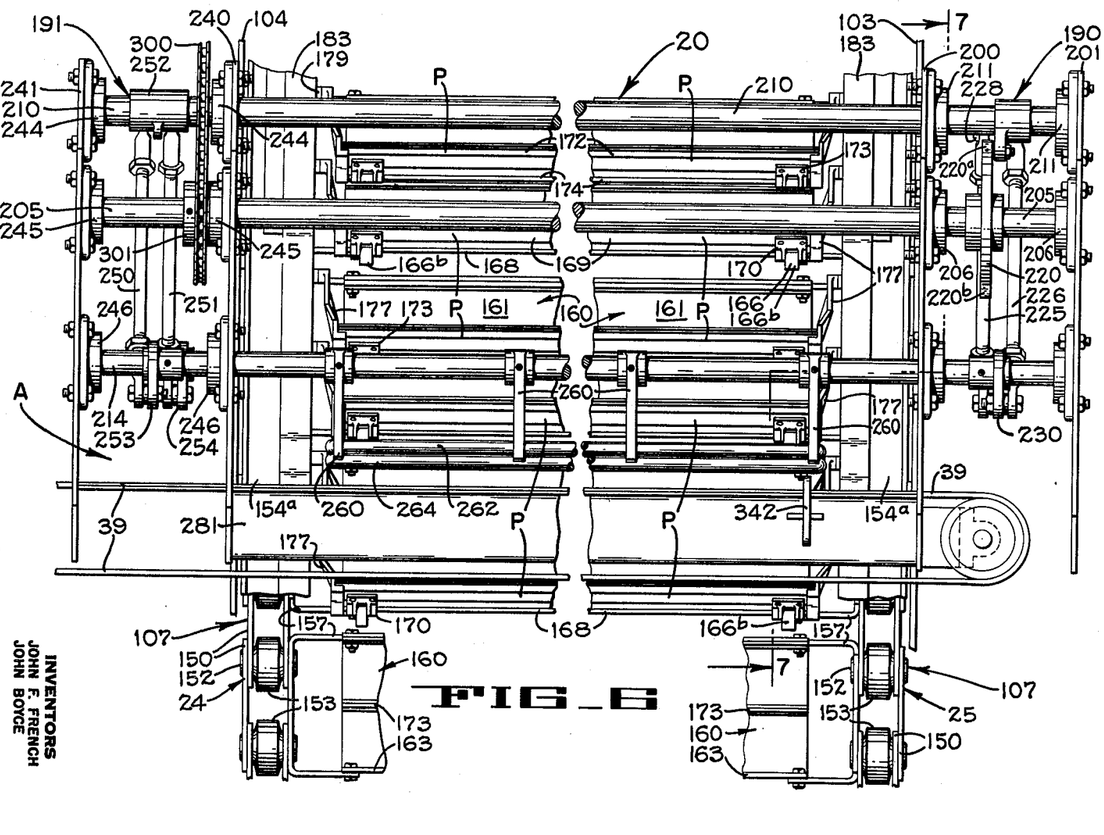
FIG. 6 is an enlarged vertical elevation of the feed station of the cooker, the view having been taken looking in the direction of arrows 6—6 of FIG. 2.

As seen in FIG. 6, certain of the links of the two chains have inwardly directed flanges 157 at each end for the purpose of supporting the carriers 20 therebetween. Since all the carriers 20 are identical, the description of one will suffice to disclose the construction of all. Each carrier 20 comprises a body 160 (FIG. 5) having a central retaining wall 161, end walls 162 and 163 extending laterally thereof, and an intermediate wall 164 also extending laterally of the central retaining wall 161. One pair of inwardly directed flanges 157 of each conveyor chain are bolted to the end walls 162 and 163. A plurality of hinge brackets 166 (FIGS. 6 and 7) are bolted to the end walls 163 at spaced intervals therealong. Each bracket has oppositely directed arms 166a and 166b which are drilled at their outer ends to receive pivot rods 168. An elongated curved, trough-shaped cover 169 is pivotally mounted on each of the pivot rods 168 by longitudinally spaced hinge elements 170 which are rigidly secured to the covers 169. Covers 172, which are identical to the covers 169, are connected by spaced hinges 173 to the intermediate walls 164 and are arranged to be pivoted about rods 174 which serve as pivot pins for the hinges 173. The body 160 of the carrier 20 and covers 169 and 172 are preferably constructed of extruded aluminum. When the covers 169 and 172 are positioned as illustrated in FIG. 7, the covers 169 cooperate with the walls 161 and 164, and the covers 172 cooperate with the walls 161 and 162 to provide four elongated carrier pockets P within which the cans being processed are positively constrained as they are carried through the machine.

Cover actuating arms 177 (FIG. 5) are secured to the ends of the covers 169 and 172, and each arm 177 is provided with an outwardly directed pin 178 having a wear bushing 179 fitted thereon. At each end of the carrier, the wear bushings 179 on the pins 178 on one side of the central retaining wall 161 are slidably received in a continuous channel track 182, and the bushings 179 on the other side of the wall 161 are slidably received in a continuous channel track 183. The channel tracks 182 and 183 are each secured, as by bolting, to the particular angle member 154 disposed adjacent thereto. Normally the tracks 182 and 183 are immediately adjacent to and in abutting contact with the inwardly directed leg 154a of their associated angle member 154 as shown at the lower end of FIG. 7. However, certain portions of the tracks 182 and 183 will run through the feed station A (FIG. 7) and through the discharge station B are bowed away from the legs 154a so that the covers 169 and 172 are opened in these areas in order to receive or discharge cans. Also, the vertical run of the tracks 182 and 183 within the cooling chamber 16 are slightly spaced from the associated legs 154a to partially open the covers 169 and 172 as they move downwardly in this chamber, permitting the water spray to more effectively cool the cans.

Figure 7:
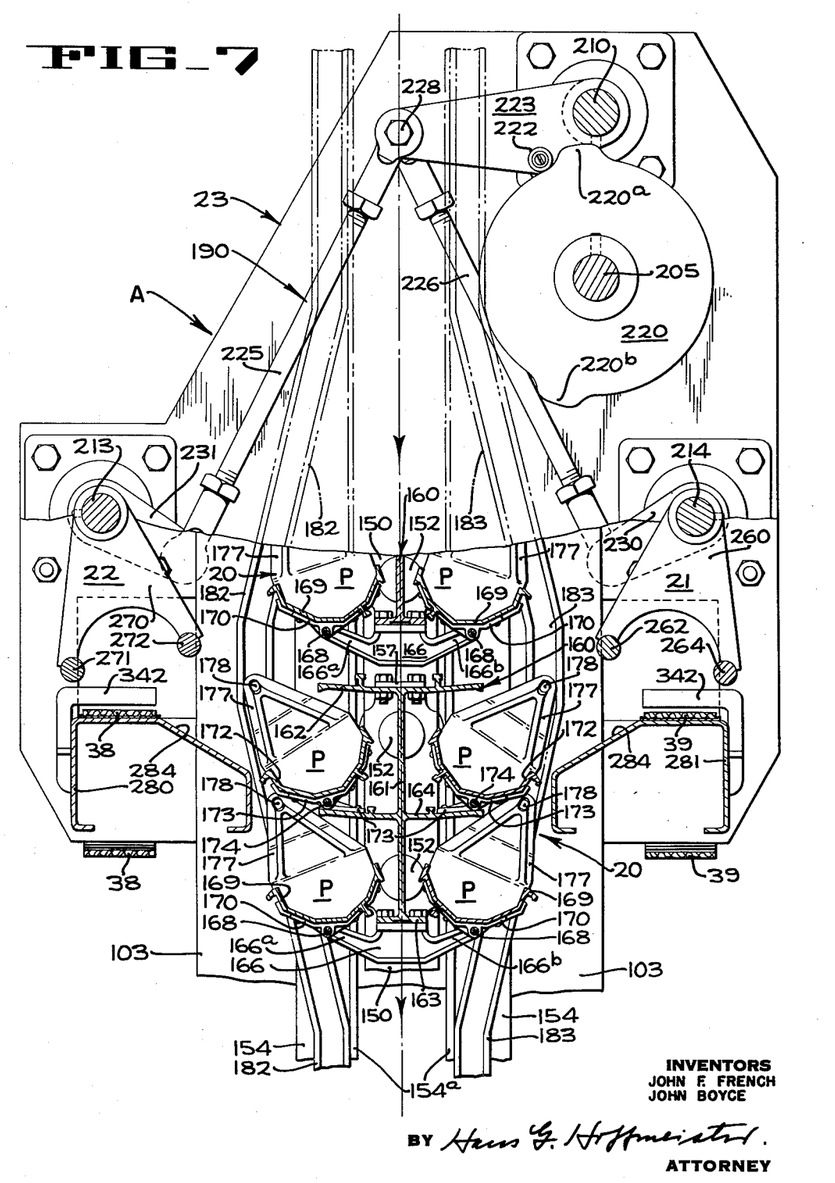
FIG. 7 is an enlarged vertical section taken along lines 7—7 of FIG. 6.

The feed mechanism 23 (FIG. 7) is arranged to receive the lines L1 and L2 of cans from the conveyors 38 and 39 and deposit them into the pockets P of the carriers 20 as the pockets pass thereby in the open position illustrated in FIGURE 7. The feed mechanism 23 comprises two actuating units 190 and 191 (FIG. 6), the unit 190 being mounted on the rear face of mounting plate 103, and unit 191 being mounted on the rear face of mounting plate 104. The actuating unit 190 comprises two identically shaped plates 200 and 201 (FIG. 4), the plate 200 being bolted to the mounting plate 103. The plates 200 and 201 are each provided with openings 204 through which the cans to be processed and the upper runs of the conveyors 38 and 39 extend. A cam shaft 205 (FIG. 6), which extends between the actuating units 190 and 191, has one end portion journalled in bearings 206 bolted on the plates 200 and 201. A rocker shaft 210 is disposed parallel to the cam shaft 205 and is journalled in bearings 211 which are bolted on the plates 200 and 201. Parallel can pusher shafts 213 and 214 (FIG. 7) are journalled in bearings 216 bolted to the plates 200 and 201. A cam 220 is keyed on the cam shaft 205 and has two lobes 220a and 220b on its periphery. The lobes 220a and 220b are arranged to engage a cam follower 222 journalled on a rocker arm 223 keyed to the rocker shaft 210. Links 225 and 226 are pivotally connected to the rocker arm 223 by a bolt 228 (FIG. 7) and project downwardly therefrom to a position adjacent the pusher shafts 213 and 214, respectively. The link 226 is pivotally connected to an arm 230 keyed to the shaft 214, and similarly, the link 225 is pivotally connected to an arm 231 keyed to the shaft 213.

The actuating unit 191 on the other side of the machine is substantially the same as the unit 190 and comprises two plates 240 and 241 (FIG. 6) which are identical to the plates 200 and 201 of unit 190, the plate 240 being bolted to the mounting plate 104. The plates 240 and 241 carry bearings 244 which journal the rocker shaft 210, bearings 245 which journal the cam shaft 205, and bearings 246 which journal the cam pusher shafts 213 and 214. Links 250 and 251 are pivotally connected at their upper ends to a rocker arm 252 that is keyed to the rocker shaft 210. At their lower ends, the links 250 and 251 are pivotally connected to crank arms 253 and 254, respectively, which are keyed to the shafts 213 and 214.

Several inverted V-shaped arms 260 (FIGS. 6 and 7) are keyed on the shaft 214 and carry rods 262 and 264 welded on the lower ends thereof, said rods being arranged to straddle a line of cans on the conveyor 39. Similarly, as shown in FIG. 7, inverted V-shaped arms 270 are keyed on the shaft 213 and have rods 271 and 272 welded on their lower ends and arranged to straddle a line of cans on the conveyor 38. The rods 264 and 271 form the previously mentioned pusher members 21 and 22 (FIG. 2) which are effective to push the lines of cans into the pockets of the carriers 20.

At the feed station A (FIG. 7), the belts of the conveyors 38 and 39 are supported on guide members 280 and 281, respectively, which are welded between the mounting plates 104 and 103. Each of the guide members 280 and 281 has a surface 284 inclined downwardly and terminating adjacent the open pockets P. The surfaces 284 serve to guide lines of cans from the conveyors 38 and 39 into the open pockets. A stop 342 is secured to each conveyor guide 280 and 281 and has a portion overlying the conveyor belt to stop the leading can on the conveyor belt so that a line of cans is formed and is held in position to be moved into the pockets P as a unit by the push rods 264 or 271. It should also be noted that when a line of cans is being moved into the pockets by either the rod 264 or the rod 271, the end surface of that rod holds back the following cans that are waiting to be moved into the feed station by the conveyors 38 and 39.

The cam shaft 205 is driven by a chain 300 (FIG. 6) that is trained over a sprocket 301 which is keyed to shaft 205 and over a sprocket 302 (FIG. 1) keyed to the output shaft 303 (FIG. 2) of a speed increasing gear box 304. The input shaft 305 of the gear box 304 is driven by a chain 308 that is trained around a sprocket 310 (FIG. 2) keyed on the input shaft 305 and around a sprocket 312 keyed to shaft 110. The cam shaft 205 makes one complete revolution during the time required for each can carrier 20 to move past the feed mechanism at feed station A. Since two pockets P are carried on each side of each carier 20, the pusher rods 271 and 264 (FIG. 7) must be actuated twice during each revolution of the cam shaft 205. The lobe 220a is timed to move under the cam follower 222 thereby raising the rocker arms 223 and 252 to actuate the previously described linkage, causing the pusher rods 271 and 264 to move inwardly toward the carrier 20. The rods 271 and 264 contact lines of cans on their associated conveyors 38 and 39, respectively, thereby moving the cans onto the inclined surfaces 284 from which they gravitate into the open pockets P. The lobe 220b is arranged to contact the cam follower 222 when the lower pockets P of the carrier 20 next above are moved down into position to be filled. The filling operation for these pockets is the same as that already described. It will be noted that, since the vertical spacing between the upper pocket of one carrier and the lower pocket of the carrier next above is greater than the spacing between pockets of the same carrier, the clockwise peripheral distance from lobe 220a to lobe 220b is greater than the distance from lobe 220b to lobe 220a.

Figure 8:
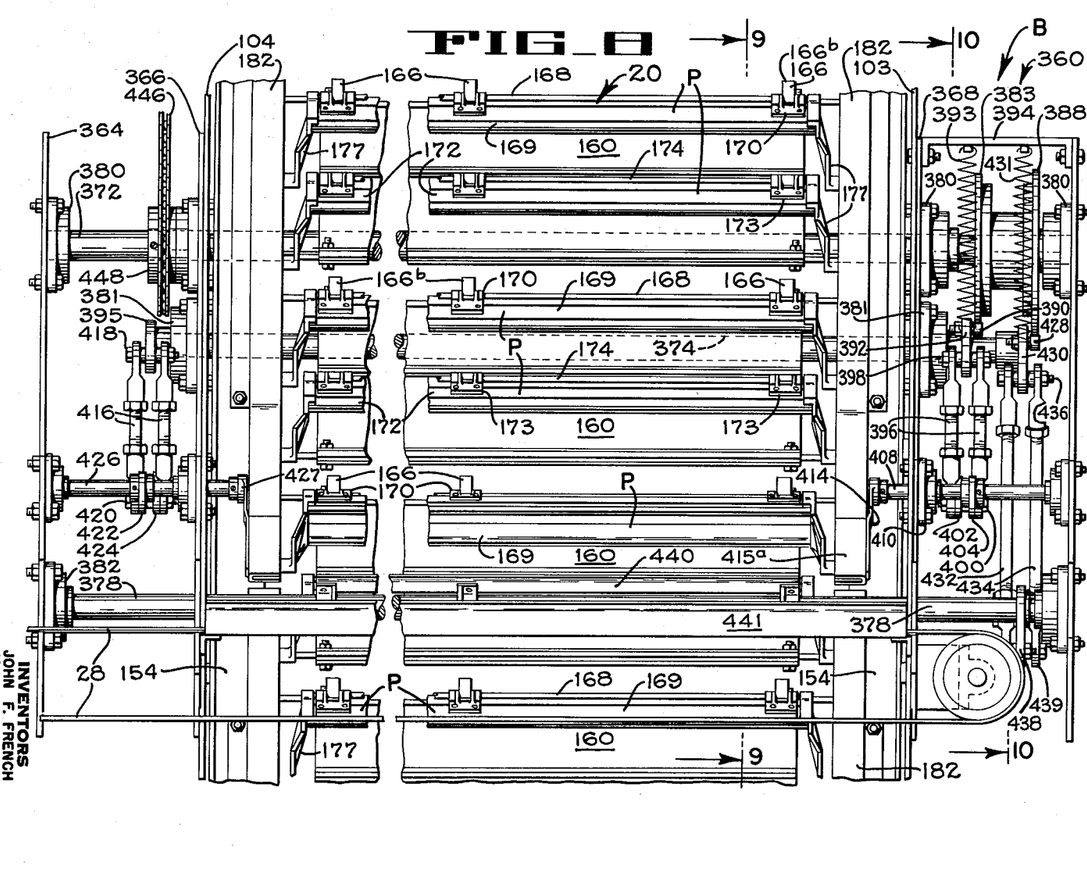
FIG. 8 is an enlarged vertical elevation of the discharge station of the cooker, the view having been taken looking in the direction of arrows 8—8 of FIG. 2.
Figure 9:
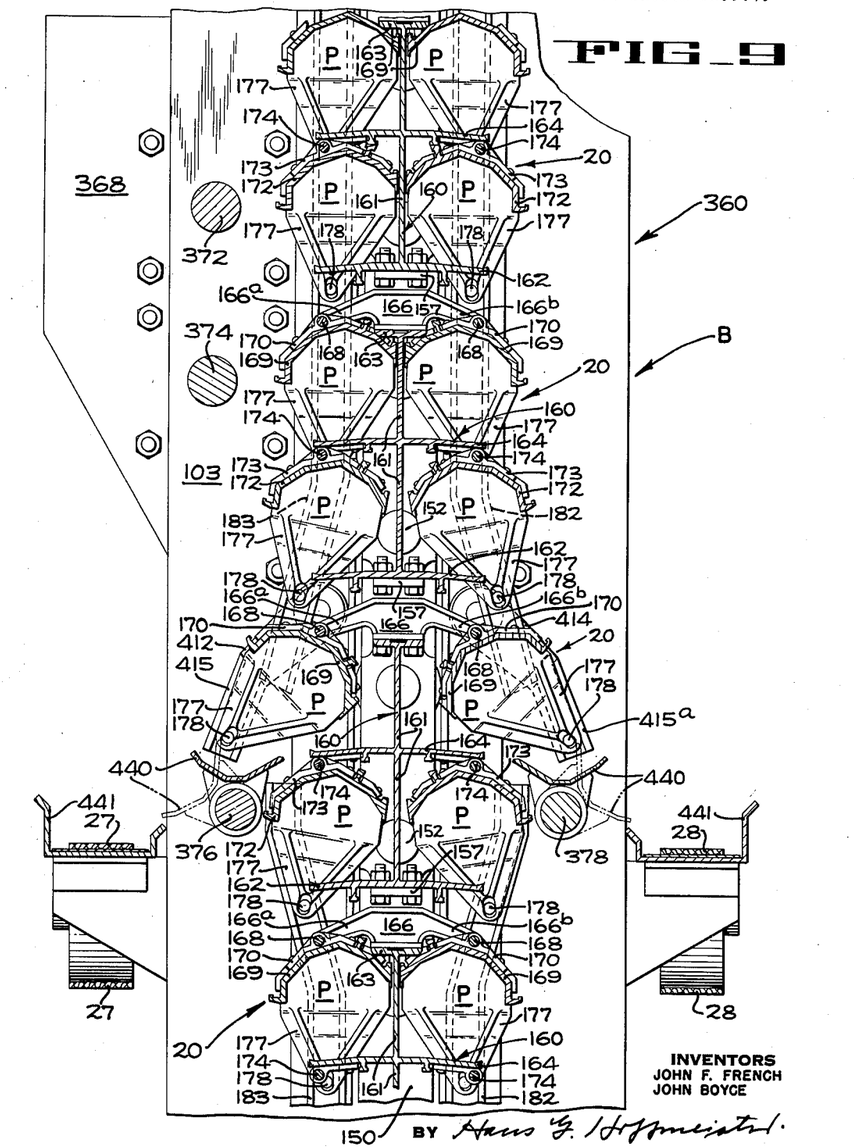
FIG. 9 is an enlarged vertical section taken along lines 9—9 of FIG. 8.
Figure 10:
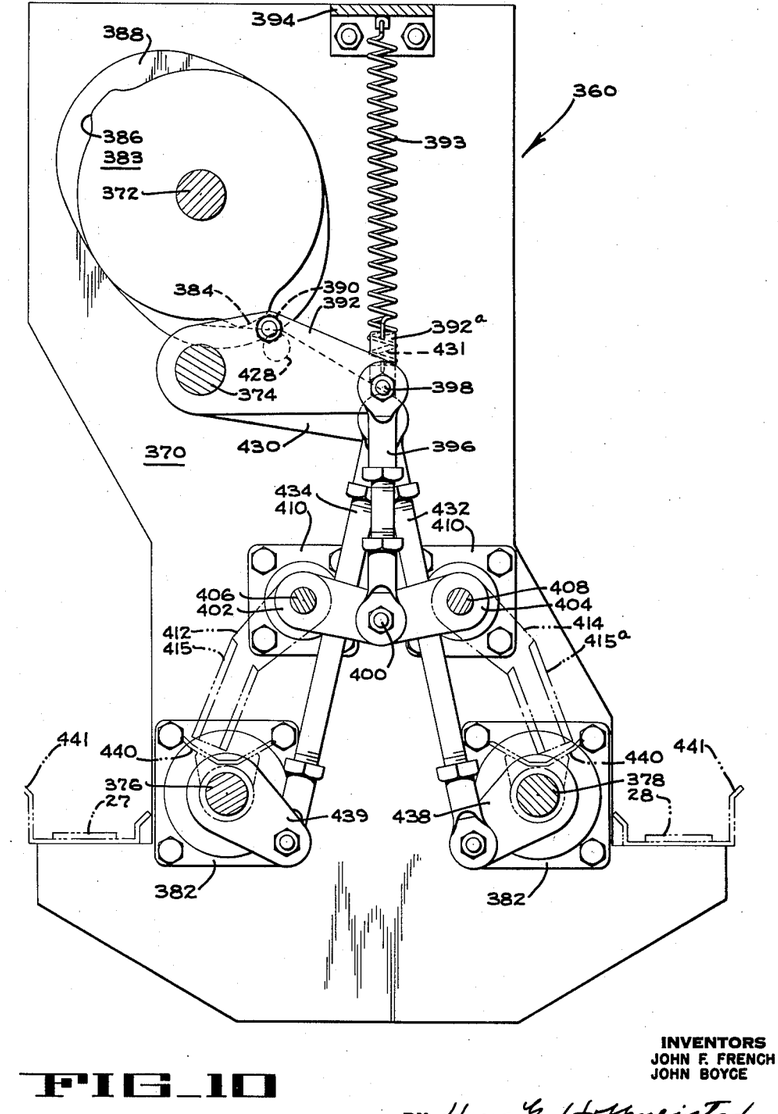
FIG. 10 is an enlarged vertical section taken along lines 10—10 of FIG. 8.

After the cans have been conveyed through the cooker and cooler, they are discharged onto the conveyors 27 and 28 by a discharge mechanism 360. The discharge mechanism 360 is supported on pairs of vertically extending plates 364, 366 and 368, 370 (FIG. 8) which are secured to the frame members 104 and 103, respectively. As seen in FIGS. 8, 9 and 10, a cam shaft 372, a rocker shaft 374, and two can supporting shafts 376 and 378 extend across the space between the plates 103 and 104 in parallel spaced relation. The cam shaft 372 is journalled in a plurality of bearings 380 that are bolted to the plates 364, 366, 368 and 370. Bearings 381, which support the rocker shaft 374, are bolted to the plates 366 and 368, and the bearings 382, which support the shafts 376 and 378, are bolted to the plates 364 and 370. The cam shaft 372 (FIGS. 8 and 10) carries a cam 392 having lobes 384 and 386 on its periphery, and a second cam 388 is also secured on the shaft 372 and has a somewhat oval periphery. A cam follower 390 (FIG. 10) rides against the periphery of the cam 383 and is journalled on a bolt secured to a rocker arm 392. A spring 393 is connected between a projection 392a of the rocker arm 392 and a bracket 394 to hold the follower 390 against the cam 383. The rocker arm 392 is keyed to the shaft 374. A second rocker arm 395 (FIG. 8), which is similar to rocker arm 392, is keyed to the shaft 374 adjacent the other end thereof and extends radially outwardly from the shaft 374 in parallel relation to the rocker arm 392.

The upper end of each of a pair of links 396 (FIG. 8 and 10) is pivotally connected to the rocker arm 392 (FIG. 10) by a bolt 398, and the lower end of each of the links 396 is pivotally connected by a bolt 400 to rocker arms 402 and 404 which are keyed to stub shafts 406 and 408, respectively. The stub shafts 406 and 408 are journalled in bearings 410 secured to the plates 368 and 370. Arms 412 and 414 (FIGS. 9 and 10), which carry short portions 415 and 415a of the channel tracks 183 and 182, respectively, are keyed to the shafts 406 and 408, respectively. At the discharge station B (FIG. 9) the tracks 182 and 183 have portions that are spaced laterally from the conveyor guide channel 154, and these offset portions include the pivotal portions 415 and 415a.

Similarly, the upper ends of a pair of links 416 (FIG. 8) are pivotally connected to the rocker arm 395 by a bolt 418. Bolts 420 pivotally connect the lower ends of the links 416 to rocker arms 422 and 424 which are keyed to parallel stub shafts 426 (only one being shown) each of which is aligned with one of the stub shafts 406 or 408. The shafts 426 carry two rocker arms 427 which are identical to the rocker arms 412 and 414, and each of the rocker arms 427 has a portion of one of the channel tracks 182 and 183 thereon.

The periphery of the oval cam 388 (FIG. 10) is arranged to ride against a cam follower 428 journalled on a bolt which is secured to a rocker arm 430. A spring 431 (FIG. 8) connected between the rocker arm 430 and the bracket 394 is provided to hold the follower 428 against the cam 388. The rocker arm 430 is pivotally mounted on the shaft 374 and has a pair of downwardly and outwardly extending links 432 and 434 pivotally secured thereto by a pivot bolt 436. The lower end of the link 432 is pivotally connected to an arm 438 (FIG. 10) which is keyed to the shaft 378, and the lower end of the link 434 is pivotally connected to an arm 439 keyed to the shaft 376. Each of the shafts 376 and 378 has an elongated trough 440 rigidly secured thereon and arranged to receive lines of cans when they are discharged from the pockets P (FIG. 9). Each of the troughs 440 is pivoted outwardly and arranged to discharge the line of cans it receives from a pocket P onto one of the endless belt conveyors 27 and 28 which continuously move in channel guides 441 that prevent the cans from rolling off the conveyors.

The drive for the discharge mechanism 360 is quite similar to the drive for the feed mechanism 23. A first chain drive 442, indicated diagrammatically in FIG. 1, connects the shaft 110 to a speed increasing gear box 444, and a second chain drive 446 connects the gear box 444 to a sprocket 448 on the shaft 372. The shaft 372 is rotated one complete revolution for each carrier 20 that passes through the discharge mechanism 360.

The timing of the cams 383 and 388 is such that as each carrier 20 moves upward past the discharge conveyors 27 and 28 each lobe 384, 386 of the cam 383 pivots the two troughs 440 outward to the positions thereof shown in phantom in FIG. 9, thus leaving space between the troughs 442 for passage of the cover therethrough. Immediately thereafter, the troughs 440 are returned to their inner positions, and while the wear bushings 179 on the actuating arms 177 of the covers 169 or 172 that have just passed between the troughs are within the pivoted sections 415 and 415a of the tracks 182 and 183, one of the lobes 384 and 386 of the cam 383 actuates the rocker arm 392. This causes the two covers 169 or the two covers 172, as the case might be, to swing outward, as shown in FIG. 9. In moving outward, the trailing edge of each cover sweeps the line of cans occupying the associated pocket P outward into the associated trough 440 and immediately thereafter the cam 388 turns so as to permit the spring 431 to tip the troughs 440 outward, dumping the lines of cans therein onto the discharge conveyors 27 and 28. This outward movement of the troughs 440 likewise provides clearance for passage therebetween of the next succeeding cover 169 or 172, as the case might be.

In order to efficiently cool the articles, a plurality of perforated troughs 450 (FIG. 1) are disposed between and secured to the side walls 75 and 76 (FIG. 3) of the cooling chamber 16. Cold water is pumped into the troughs 450 and is discharged as a spray against the carriers 20 as they pass through the chamber. A plurality of baffles 451, 452 and 453 (FIG. 1), which extend across the chamber 16, redirect the sprayed water against other carriers and the containers therein.

To further improve the cooling action in cooling chamber 16, blower 458 is arranged to force air into the chamber through a conduit 460. The air flows upwardly through the chamber and is exhausted through a conduit 461. If desired, both conduits 460 and 461 can be opened to atmosphere to permit evaporative cooling to take place by allowing a convection-induced flow of air to move through the chamber.

In the operation of the continuous pressure cooker and cooler (FIGS. 1 and 3) of the present invention, sealed cans at approximately 170° F. are carried by the conveyors 44 from a seamer (not shown) to chutes 30 and 31 which guide the cans onto the elevators 32 and 33, respectively. The cans are than elevated to the top of the cooker and are discharged upon the inclined chutes 34 and 35 (FIG. 2) which guide the cans into the conveyors 36 and 37, respectively. The cans are moved from the conveyors 36 and 37 onto the conveyors 39 and 38 which move the cans into position to be discharged laterally in lines of several cans into the pockets P (FIG. 5) of the carriers 20.

The lines of cans are moved into the pockets P (FIG. 7) when the lobes 220a and 220b of the cam 220 contact the roller 222 to pivotally actuate the rocker shaft 210 and the linkage connected to the push off rods 271 and 264. The rods 271 and 264 are thus intermittently moved towards each other to move the lines of cans off the conveyors 38 and 39, respectively, and onto the inclined surfaces 284. The lines of cans then gravitate into the carrier pockets P which have been opened by the bowed portion of the tracks 182 and 183. The pockets 244 and 248 are then closed by the channel tracks 182 and 183 to positively restrain each line of cans in its associated pocket while the carrier is moved through its straight runs as well as its curved runs throughout the path of travel in the continuous cooker and cooler.

The cans at approximately 170° F. enter water at 200° F. at the top of the inlet leg 18 (FIG. 1) and move downwardly in the water which increases in temperature to approximately 245° F. at the bottom of the leg 18 and in the trough 13. The cans are then moved through steam at 252° F. in the sterilizing chamber 26 where the major portion of the cooking takes place. The cans are then moved out of the chamber 26 through the 245° F. water in the trough 13 and up through the discharge leg 17 wherein the water is at approximately 200° F. at the upper end thereof.

Cold water entering the discharge leg 17 causes a continuous flow of water through the legs 17 and 18 and through the ports 86 and 88 in a direction opposite to the direction of movement of the carriers in these legs. This flow of water through the two legs 17 and 18 maintains the water in the legs at the desired temperature. After the cans leave the discharge leg 17, the cans enter the cooling chamber 16 where they are treated with sprays of cold water at approximately 55° F. from the perforated troughs 450. While the carrier is moved downwardly in the cooling chamber 16 the covers 169 and 172 are held partially open, in positions similar to the positions illustrated by the covers 172 in FIG. 7, by the channel tracks 182 and 183 which in this part of the apparatus are spaced a small distance from the associated legs of the angle members 154. When in this partially opened position, more cooling water is applied directly onto the cans than would be possible if the covers were not partially opened. The covers 169 and 172 are again closed by the tracks 182 and 183 before the carriers 20 move around the lower curved track and into the upward run of the conveyor chains in the cooling chamber 16 (FIG. 1).

The cans leave the cooling chamber at approximately 100° F. and are moved into the discharge mechanism 360 where the lines of cans are discharged onto the conveyors 27 and 28 (FIG. 9) as previously described. The conveyors 27 and 28 (FIG. 2) move the cans onto the conveyors 40 and 41, respectively, which advance the same into the elevators 32 and 33, respectively. The cans are discharged from the elevators 33 and 32 (FIG. 3) onto the chutes 42 and 43, respectively, which guide the cans onto the conveyors 44. The conveyors 44 move the cans away from the continuous pressure cooker and cooler and deliver them to the other can handling machines such as a labeling machine (not shown).

Although the continuous cooker and cooler has been described as having a single feed mechanism 23 and a single discharge mechanism 360 which move lines of cans into and receive lines of cans from each pocket P of the carriers, it is apparent that two or more feed and discharge mechanisms can be provided to feed alternate ones of the pockets P. This feature permits a more rapid feeding of cans to the carriers and discharge of cans from the carriers.

From the foregoing description it is apparent that the pressure cooker and cooler of the present invention utilizes improved carriers which are arranged to positively constrain rows of cans as they travel through the cooker without requiring special and expensive can guides for this purpose. The positive can constraining feature of the carriers permits the use of low cost cylindrical pressure vessels by eliminating the need of strengthening ribs to prevent bowing of flat pressure retaining surfaces. The carriers are readily opened to rapidly receive lines of cans from the feed mechanism and cooperate with the discharge mechanism to rapidly and positively discharge cans therefrom. The carriers are also arranged to be partially opened to permit more rapid cooling of the cans.

While the cooker has been disclosed as having steam under pressure in the processing chamber 26, it is within the scope of the present invention to supply other sterilizing mediums to this chamber, as for example, steam at zero pressure or water at any pressure above atmospheric pressure. Although the carrier of the invention has been disclosed as having trough-shaped covers 169 and 172 on both sides of a central wall so that articles can be received and discharged from both sides, it is to be understood that such carriers may be provided with covers on only one side of a support wall for installations in which feeding and discharging of articles from only one side is desired.

Since the carriers are provided with easily opened and closed hinged covers, it is possible to feed cans to and discharge cans from vertical runs of the carrier conveyor, thereby eliminating many curves which are required by other cookers of similar construction. This feature also makes it possible to reduce to a minimum the portion of the carrier conveyor required for the feeding and the discharging operations.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to protect by Leters Patent is:

1. In a continuous pressure cooker and cooler, a continuously driven conveyor arranged to move along a predetermined path, said conveyor comprising a pair of spaced parallel endless chains, a plurality of spaced article carriers connected to and disposed between said chains and each carrier having a trough-like cover pivotally mounted thereon and having a trailing edge projecting into the associated carrier, each of said covers being arranged to be pivoted from an open position wherein articles are fed into or discharged from the associated carriers to a closed position wherein the articles are positively confined within said carriers, and a continuous track operatively associated with said covers to move each cover between said open and said closed position, said trailing edge of each cover being arranged to positively engage articles within the associated carrier and push the articles out of the same when the cover is moved to its open position.

2. In a continuous pressure cooker and cooler, a conveyor comprising a pair of spaced parallel endless chains, a plurality of spaced article carriers connected to and disposed between said chains, each carrier having a trough-like cover pivotally mounted thereon with a trailing edge projecting into the associated carrier, and means in the cooker and cooler operatively connected to said covers to move each cover between an open article-receiving position and a closed article-constraining position, said trailing edge of each carrier being arranged to positively engage articles within the associated carrier and push the articles out of the same when the cover is moved to its open position.

3. In a continuous pressure cooker and cooler, a convepor comprising a pair of spaced parallel endless chains, a plurality of elongated spaced article carriers connected to and disposed between said chains, each carrier having an elongated trough-like cover pivotally mounted thereon and arranged to be pivoted from an open position wherein articles are fed into or discharged from said carrier to a closed position wherein the articles are positively confined within said carrier, arms secured to each end of said cover and acting as end closures for said carrier, cover actuating means secured to said arms and extending outwardly therefrom, and a cam track disposed adjacent said conveyor and operatively associated with said cover actuating means to move said cover between the open and closed position.

4. In a continuous pressure cooker and cooler, an endless conveyor arranged to be moved along a predetermined path, a plurality of elongated article carriers on said conveyor, each carrier having an elongated cover pivotally mounted thereon and movable between an open and a closed position, a cam track disposed adjacent one end of said elongated cover and having a bowed portion therein, an arm secured to said one end of said cover, a cam follower connected to said arm and operatively connected to said cam track, said bowed portion of said cam track cooperating with said cam follower to open said cover, conveying means adjacent said bowed portion of said track for moving and holding a row of articles in position to be moved into said carrier, pusher means arranged to move the row of articles from said conveying means into said carrier, and means timed with the movement of said conveyor for actuating said pusher means.

5. In a continuous pressure cooker and cooler, an endless conveyor arranged to be moved along a predetermined path, a plurality of elongated article carriers on said conveyor, each carrier having an elongated cover pivotally mounted thereon and movable between an open and a closed position, each cover being curved laterally to define an elongated article-supporting trough, a cam track disposed adjacent one end of said elongated cover and having a bowed portion therein, an arm secured to said one end of said cover, a cam follower connected to said arm and operatively connected to said cam track, said bowed portion of said cam track cooperating with said cam follower to open said cover, conveying means adjacent said bowed portion of said track for moving and holding a row of articles in position to be moved into said carrier, pusher means arranged to move the row of articles from said conveying means into the trough defined in said cover, and means timed with the movement of said conveyor for actuating said pusher means.

6. In a continuous pressure cooker and cooler, an endless conveyor arranged to be moved along a predetermined path, an elongated article carrier on said conveyor, an elongated cover pivotally mounted on said carrier and arranged to be moved from a closed article-constraining position to an open article-receiving position, a cam track mounted on one side of said predetermined path and having an outwardly bowed portion, a cam follower slidably received in said cam track and connected to said cover, said cam follower being arranged to open said cover when moving through the bowed portion of said cam track, an elongated conveyor guide having an inclined surface disposed parallel to and immediately adjacent said cover when opened, a feed conveyor movable along said guide and arranged to move a row of articles into position parallel to said cover, a shaft parallel to and mounted for rotation above said feed conveyor, a pair of spaced rods parallel to and disposed on opposite sides of the row of cans, means rigidly connecting said rods to said shaft, a linkage operatively connected to said shaft, and cam means timed with said conveyor to actuate said linkage and rotate said shaft whereby one of said rods contacts the row of articles to move the same off the feed conveyor and onto said inclined surface for gravitation into said open cover.

7. In a continuous pressure cooker and cooler, a conveyor, means for guiding said conveyor along a predetermined path, a pair of parallel spaced tracks secured to said guiding means and disposed on opposite sides of said predetermined path, a plurality of article carriers carried by said conveyor, each carrier having a pair of covers pivotally mounted thereon with the covers disposed on different sides of said predetermined path, a cam follower connected to each cover, each cam follower being slidably received in the track adjacent thereto to hold said covers in article-constraining position, each of said tracks having a bowed portion therein for moving the cover to a partially opened position, a shaft journaled adjacent each bowed portion, each shaft having an arm keyed thereon, each arm having a movable section of the bowed portion of the adjacent track secured thereon and arranged upon rotary movement of the associated shaft to be moved from a position in alignment with the rest of the associated bowed portion to a position displaced from the same while the associated cam follower is within the track section to completely open said cover and discharge an article from the associated carrier, and means connected to said shafts for pivoting the same in timed relation with the movement of said conveyor.

8. In a continuous pressure cooker and cooler, a conveyor, means for guiding said conveyor along a predetermined path, a pair of parallel spaced tracks secured to said guiding means and disposed on opposite sides of said predetermined path, a plurality of article carriers carried by said conveyor, each carrier having a pair of covers pivotally mounted thereon with the covers disposed on different sides of said predetermined path, a cam follower connected to each cover, each cam follower being slidably received in the track adjacent thereto to hold the associated cover in article-constraining position, each of said tracks having a bowed portion therein for moving the covers to a partially opened position, a shaft journaled adjacent each bowed portion, each shaft having an arm keyed thereon, each arm having a movable section of the bowed portion of the adjacent track secured thereon and arranged upon rotary movement of the associated shafts to be moved from a position in alignment with the rest of associated bowed portion to a position displaced from the same while the associated cam follower is within the track section to completely open the associated cover and discharge an article from the associated carrier, means connected to said shafts for pivoting the same in timed relation with the movement of said conveyor, a pair of troughs disposed parallel to and in position to receive articles from the covers upon opening thereof, each trough being supported by a rotatable shaft, and means connected to said second mentioned shafts to rotate said second mentioned shafts and said troughs connected thereto in opposite directions to discharge the articles therefrom in timed relation wtih the movement of said conveyor.

9. An article carrier for a continuous pressure cooker and cooler comprising, a central dividing wall, a wall on each end of said central dividing wall, said end walls projecting laterally outward from both sides of said central dividing wall, an intermediate wall secured to said dividing wall and projecting outwardly from both sides thereof, a cover pivotally connected to each end of said intermediate wall and cooperating with one end wall and said central dividing wall to define article-constraining pockets when said covers are pivoted to a closed position, a plurality of hinge brackets secured to the other end wall and projecting laterally outwardly from both sides of said central dividing member, a cover pivotally mounted on each end of said hinge bracket and cooperating with said central dividing wall and said intermediate wall to define article-constraining pockets when said covers are pivoted to a closed position, and a wall secured on each end of each of said covers.

10. In a continuous pressure cooker and cooler, a continuously driven endless conveyor, means for guiding said conveyor along a predetermined path, a continuous channel track secured to said guiding means, a plurality of elongated article carriers carried by said conveyor, an elongated cover pivotally mounted on each of said carriers and movable between a closed article-constraining position and an open article-receiving or discharging position, each of said covers being trough-shaped for supporting articles therein when the associated carrier is moving in a certain direction, a cam follower connected to each of said covers and slidably received in said channel track to hold the cover in article-constraining position when the cam follower is within a part of said channel track that is disposed closely adjacent said guiding means, said track having an outwardly bowed portion arranged to open said covers as they pass thereby, a feed conveyor disposed parallel to said elongated carriers adjacent said bowed portion of said track and arranged to move rows of articles into position to be moved into each of said open covers as they pass thereby, an inclined surface mounted in fixed position between said feed conveyor and said open covers and arranged to guide articles into said open covers as they pass thereby, and means operative in timed relation with the movement of said conveyor for pushing a row of articles off the feed conveyor and into each open cover passing thereby.

11. In a continuous pressure cooker and cooler, a continuously driven endless conveyor, means for guiding said conveyor in a predetermined path, a continuous channel track secured to said guiding means, a plurality of elongated article carriers carried by said conveyor, an elongated cover pivotally mounted on each of said carriers and movable between a closed article-constraining position and an open article-receiving or discharging position, each of said covers being trough-shaped for supporting articles therein when the associated carrier is moving in a certain direction, a cam follower connected to each of said covers and slidably received in the channel track and arranged to hold the cover in article-constraining position when the cam follower is within a part of said channel track that is disposed adjacent said guiding means, said track having an outwardly bowed portion arranged to open said covers as they pass thereby, a feed conveyor disposed parallel to said elongated carriers adjacent said bowed portion of said track and arranged to move a row of articles into position to be moved into an open cover passing thereby, an inclined surface mounted in fixed position between said feed conveyor and said open covers and arranged to guide articles into said open covers as they pass thereby, means operative in timed relation with the movement of said conveyor for pushing a row of articles off the feed conveyor and into an open cover passing thereby, a pivot shaft mounted for rotation and being disposed adjacent said guiding means, an arm keyed to said shaft, a section of said track secured to said arm and arranged to be moved from a position aligned with said track to a position disposed from said track upon pivotal movement of said pivot shaft, and means timed with said conveyor and connected to said pivot shaft for oscillating said pivot shaft when said cam follower of each of the associated cover is disposed within said section of track to positively open said covers and discharge the articles therefrom.

12. An article carrier for a continuous pressure cooker comprising a support wall, a pair of spaced end walls projecting laterally from said support wall, an intermediate wall disposed between said end walls and secured to and projecting laterally from said support wall, a first cover pivotally connected to said intermediate wall and cooperating with one of said end walls and said support wall to define an article-constraining pocket when said first cover is pivoted to a closed position, and a second cover pivotally carried by the other end wall and cooperating with said support wall and said intermediate wall to define an article-constraining pocket when said second cover is pivoted to a closed position.

13. An article carrier comprising a support member having a rear wall and two spaced side walls projecting laterally from the rear wall, and a trough-shaped cover pivotally mounted on one side wall of said support member and cooperating with the other side wall to define an article-receiving pocket when said cover is in one pivoted position, said cover having a portion arranged to contact an article in said pocket and push it out of said pocket when said cover is pivoted away from said one pivoted position.

References Cited in the file of this patent
UNITED STATES PATENTS

| | | |
|---|---|---|
| 730,539 | Joor | June 9, 1903 |
| 1,130,568 | Callow | Mar. 2, 1915 |
| 1,560,520 | Addison | Nov. 10, 1925 |
| 1,741,579 | Meyer | Dec. 31, 1929 |
| 1,922,856 | Marasso | Aug. 15, 1933 |
| 2,338,258 | Ray | Jan. 4, 1944 |
| 2,806,423 | Winden | Sept. 17, 1957 |